F. J. BEAUCOND.
DISTRIBUTING TERMINAL FOR TELEPHONE CABLES.
APPLICATION FILED NOV. 20, 1907.

923,933.

Patented June 8, 1909.
2 SHEETS—SHEET 1.

Fig-1-

WITNESSES:
John E. Heller.
Minnie C. Rollwage.

INVENTOR
Frank J. Beaucond.
BY
Abraham Knobel
ATTORNEY

F. J. BEAUCOND.
DISTRIBUTING TERMINAL FOR TELEPHONE CABLES.
APPLICATION FILED NOV. 20, 1907.

923,933.

Patented June 8, 1909.

2 SHEETS—SHEET 2.

WITNESSES:
John E. Heller.
Minnie C. Rollwage.

INVENTOR
Frank J. Beaucond.
BY Abraham Knobel,
ATTORNEY

UNITED STATES PATENT OFFICE.

FRANK JAMES BEAUCOND, OF NEW ALBANY, INDIANA, ASSIGNOR TO SOUTHERN INDIANA ELECTRICAL COMPANY, INCORPORATED, OF NEW ALBANY, INDIANA, A CORPORATION OF INDIANA.

DISTRIBUTING-TERMINAL FOR TELEPHONE-CABLES.

No. 923,933.  Specification of Letters Patent.  Patented June 8, 1909.

Application filed November 20, 1907. Serial No. 403,051.

*To all whom it may concern:*

Be it known that I, FRANK JAMES BEAUCOND, a citizen of the United States, residing at New Albany, in the county of Floyd and State of Indiana, have invented a new and useful Distributing-Terminal for Telephone-Cables, of which the following is a specification.

This invention relates to distributing terminals for telephone cables, and the objects of my improvements are, comparative inexpensiveness of manufacture, compactness, easy access to the terminal wires, the support of fuses in such a position that they can easily be removed and replaced, protection from moisture by thoroughly sealing the terminal wires with an insulating compound, facility and rapidity of fastening the cable securely to the distributing terminal without soldering, security of fastening the wires to fuse-fixtures, and the proper alinement of the wires. These objects I attain by means of the devices illustrated in the accompanying drawings in which—

Figure 1:
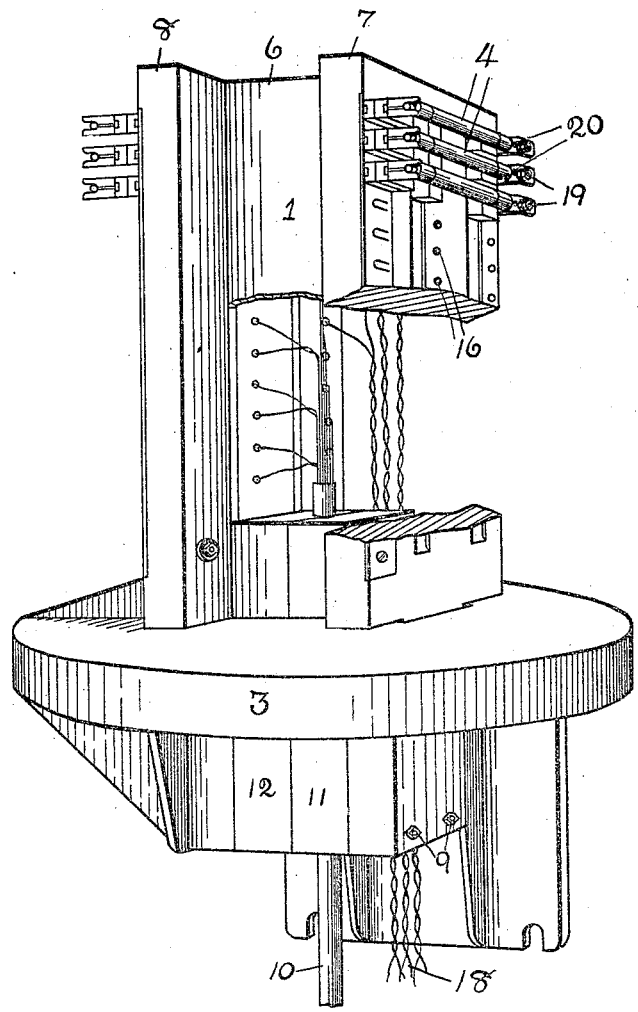
Figure 2:
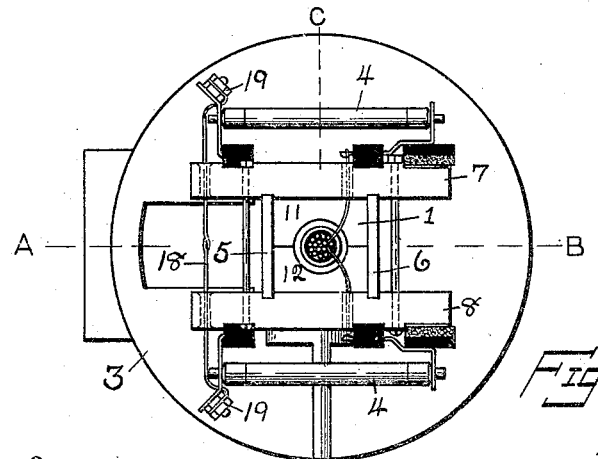
Figure 3:
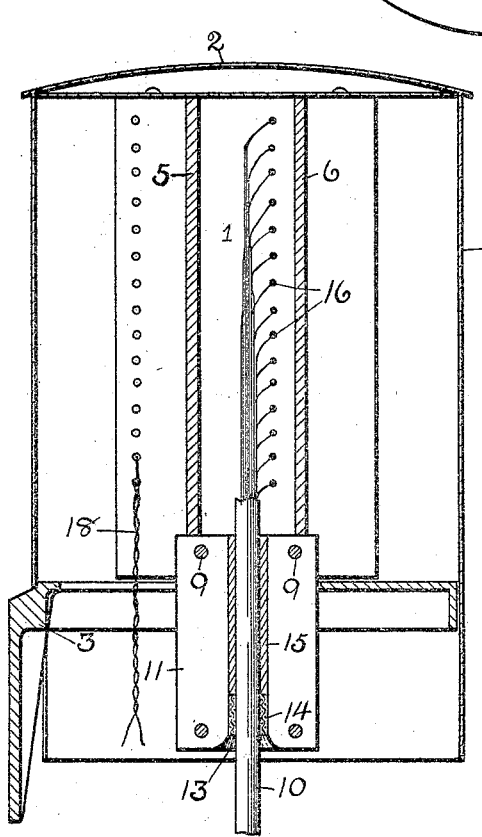
Figure 4:
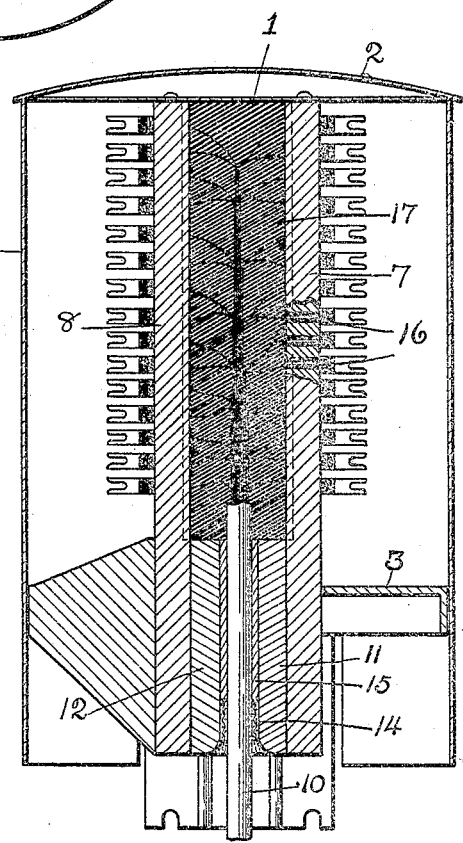

Figure 1 is a perspective view, parts being broken away to show the arrangement of the wires; Fig. 2, a plan view; Fig. 3, a vertical section on line A—B of Fig. 2; and, Fig. 4, a vertical section on line C—D of Fig. 2.

Similar reference numerals refer to similar parts throughout the several views of the drawings.

The terminal box 1, made preferably of hard wood, a sheet-metal cylindrical cover 2, and a supporting bracket 3, by means of which it is secured to the pole or other support, form the body of my terminal apparatus. But these parts are not new, being well known in telephone practice. The fuses 4 are also of the conventional type. The box 1 is preferably of rectangular cross section and made up of two upright sides 5 and 6 of hardwood which are secured in grooves formed in sides 7 and 8, preferably of hardwood and extending beyond the first named sides. The boards 7 and 8 are fastened to bracket 3 preferably by means of bolts 9. This arrangement forms the rectangular upright box 1 with a hollow space to accommodate the fanned-out wires extending from a cable 10. Heretofore the practice has been to solder the end of cable 10 in what is known as a pothead which has been secured in a pothead support in the terminal apparatus. Great difficulty has been experienced in so sealing the ends of the wires issuing from the cable as to prevent moisture penetrating along the wires between the wires and the insulating covering and entering within the lead armor of the cable and interfering with the insulation. I have dispensed with the pothead, and also with the soldering, which is a difficult job to accomplish in the open air where it is frequently necessary to contend with high winds and rain. To hold the cable I use two blocks 11 and 12 suitably grooved in their adjacent faces with the resulting hole formed by the grooves between the blocks rounded at 13 to prevent kinking the cable if it should be bent at that point. Packing 14, of jute or similar substance, is placed in the lower end of the hole between blocks 11 and 12 and adapted to surround and snugly fit cable 10. When the cable 10 has been inserted between blocks 11 and 12, the blocks are brought together tight by means of transverse bolts 9, so as to clamp the cable by means of packing 14. This still leaves an annular space above the packing, which is filled by pouring in an adhesive compound 15, which has previously been melted by heat, until the space is filled. Adhesive compound 15 melts at so high a temperature that it is not affected by climatic temperatures and thus holds the cable secure under all ordinary temperatures.

The end of cable 10 is of such length above blocks 11 and 12 that the wires within the cable are long enough to reach all the terminal-fixtures. The lead armor of cable 10 is removed from the point just above the upper end of blocks 11 and 12. The wires with their paper insulation may now be fanned-out ready to pass out through walls 7 and 8 of box 1 to the fuses or other terminal-fixtures. Just under each fuse-bracket or other fixture to which the wires are to be secured a hole is made through boards 7 and 8, and these holes are bushed with insulating tubes or bushings 16 which are adapted to fit tightly in the wood of sides 7 and 8 and have an internal diameter suitable to allow the wires to pass through with a snug fit. The wires are bared of their paper insulation from their free ends to the point where they enter bushings 16, so that the bare wires pass through the bushings. It will be understood that the wires are thus kept suitably separated and insulated from one another within box 1 by the paper insulation. After all the wires have been suitably led out through bushings 16, the entire space within box 1 is filled by pouring in an insulating compound 17 which has previously been melted. The insulating compound 17 fills the space and upon cooling prevents movement and displacement of the wires, covers the wires closely right up to the insulating bushings 16, thoroughly seals the end of cable 10, and thus prevents the entrance of any moisture to the cable. The wires protruding from the insulating bushings 16 may now be secured to the fuse-brackets by soldering or other suitable method, being outside of the box 1 and easily accessible, or they may be allowed to remain in pigtails if not required for immediate use. The bridle wires 18, which pass out from the distributing terminal, are passed through suitable holes in the outer edges of boards 7 and 8 and their ends are secured to the fuse-brackets by means of nuts 19 in the usual way.

I have improved the fuse-bracket by making a hole through the bracket at 20 just between nut 19 and the end of fuse 4. By this means I secure a more direct path for wire 18 (Fig. 2) to the binding post and attain a more secure fastening of the wire by wrapping it about the post after it issues from the hole at 20 in the bracket.

It will be understood that I have provided a secure fastening for the cable without soldering, which may be quickly and easily manipulated by means of ordinary lineman's tools, that I have avoided any splicing on of weather proof wires to the regular wires of the cable, have eliminated the pothead, provided unfailing insulation, have dispensed with the binding-screws heretofore used through boards 7 and 8, and brought the wires directly to the surface perfectly insulated and moisture proof without a break or splice and placed them where they are readily accessible.

Having thus described my invention so that any one skilled in the art pertaining thereto may make and use it, I claim—

1. Electrical terminal apparatus, comprising a supporting-bracket, a box on said bracket for the terminal ends of the wires of a lead-covered cable, and clamping-blocks on said supporting bracket provided with a lining of adhesive compound for holding a lead-covered cable.

2. Electrical terminal apparatus, comprising a supporting-bracket, clamping-blocks provided with adhesive means for holding the free end of a lead-covered cable, on said supporting bracket, fusible insulating-compound, and a receptacle for said fusible insulating-compound in which the wires of a cable are fanned out, the walls of said receptacle being provided with holes for the exit of the wires of the cable intact.

3. Electrical terminal apparatus, comprising a supporting-bracket, clamping-blocks for the free end of an armored cable provided with adhesive lining, a box surrounding the bared end of the armored cable and its extending insulated wires, the walls of said box being provided with holes for the exit of wires, a fusible insulating-compound surrounding said bared end of the cable and its extending insulated wires, insulating bushings in the holes of said box, through which the bared ends of the wires are led intact to terminal-fixtures, and terminal-fixtures on the outside of said box.

FRANK JAMES BEAUCOND.

Witnesses:
D. B. MEDANIEL,
MINNIE C. ROLLWAGE.